United States Patent [19]

Leitgeb

[11] Patent Number: 4,677,331

[45] Date of Patent: Jun. 30, 1987

[54] SYNCHRONOUS ELECTRICAL MACHINE WITH PERMANENT MAGNET EXCITATION

[75] Inventor: Wilhelm Leitgeb, Berlin, Fed. Rep. of Germany

[73] Assignee: Siemens Aktiengesellschaft, Berlin and Munich, Fed. Rep. of Germany

[21] Appl. No.: 842,512

[22] Filed: Mar. 21, 1986

[30] Foreign Application Priority Data

Mar. 22, 1985 [DE] Fed. Rep. of Germany ....... 3510985

[51] Int. Cl.$^4$ .......................................... H02K 21/12
[52] U.S. Cl. ................................................... 310/156
[58] Field of Search ................. 310/156, 154, 181, 41, 310/162-165; 318/138, 254

[56] References Cited

U.S. PATENT DOCUMENTS

| | | | |
|---|---|---|---|
| 2,601,517 | 6/1952 | Hammes | 172/278 |
| 3,054,916 | 9/1962 | Cobb | 310/164 X |
| 3,078,381 | 2/1963 | Volkrodt | 310/156 |
| 3,124,733 | 3/1964 | Andrews | 318/138 |
| 3,169,203 | 2/1965 | Lavin et al. | 310/156 |
| 4,459,500 | 7/1984 | Miyamoto | 310/154 |

FOREIGN PATENT DOCUMENTS

| | | |
|---|---|---|
| 2637705 | 2/1978 | Fed. Rep. of Germany . |
| 3224904 | 1/1984 | Fed. Rep. of Germany . |
| 1176490 | 4/1959 | France . |
| 2362520 | 3/1978 | France . |
| 1028058 | 5/1966 | United Kingdom . |

OTHER PUBLICATIONS

Patent Abstracts of Japan, vol. 4, No. 83 (E-15) (565) Jun. 14, 1980.
IEEE Transactions on Magnetics, vol. Mag-20, No. 5, Sep. 1984 Weh, Moseback & May "Design Concepts and Force Generation in Inverter-Fed Synchronous Machines with Permanent Magnet Excitation".
Patent Abstracts of Japan vol. 4, No. 83 (E-15) (565) Jun. 14, 1980 Etz Vol. 100, Issue 24 (1979), pp. 1382-1386 Grotstollen & Pfaff "Buerstenloser Drehstrom-Servoantrieb mit Erreguag durch Dauermagnete".

Primary Examiner—Donovan F. Duggan
Attorney, Agent, or Firm—John Francis Moran

[57] ABSTRACT

To keep the voltage rating of the components of a static converter as low as possible, the permanent magnets of a permanent magnetically excited converter-fed synchronous motor with a preferred direction of rotation which are mounted on circumferential surface of the soft-magnetic part of the rotor have a thickness which, along the line of the magnetization, increases from a first entering edge to the other leaving edge of the permant magnet with the thickness at the first edge being nearly zero. The magnetic air gap increases from said first edge to the adjoining pole gap. The supply currents having rectangular time patterns are controlled in accordance with the position of the rotor so that the electrical loading is routed only along the q axis.

4 Claims, 1 Drawing Figure

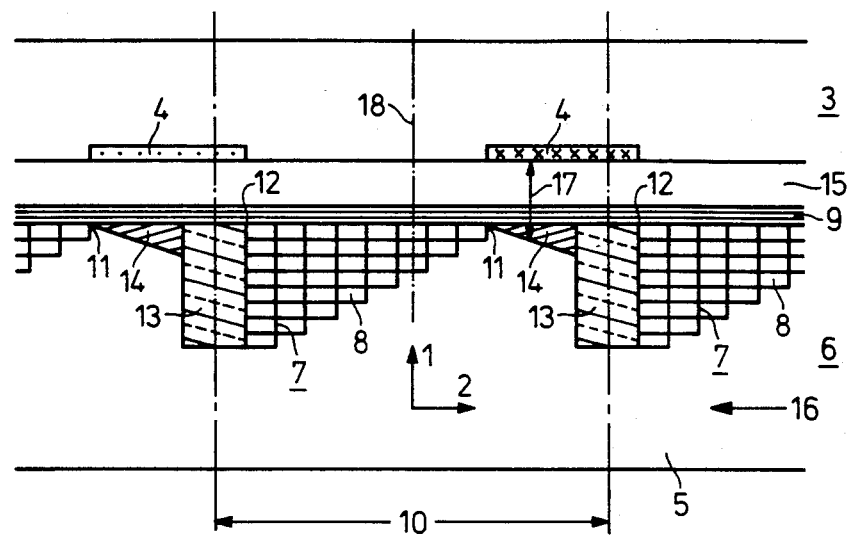

SYNCHRONOUS ELECTRICAL MACHINE WITH PERMANENT MAGNET EXCITATION

BACKGROUND OF THE INVENTION

This invention relates to an electrical machine of the synchronous type whose stator winding is fed by a static converter, and it relates, more particularly, to a synchronous machine which is excited by permanent magnets within the rotor. There are pole gaps and the rotor has a soft-magnetic component on whose circumferential surface the permanent magnets are mounted directly adjoining the mechanical air gap.

An electrical machine of this type is described in the German Publication "etz", volume 100, issue 24, 1979, pages 1382–1386 (FIG. 3a, in particular). The electrical machine is the synchronous motor of a servo drive. Permanent magnets exciting the motor are mounted on the circumferential surface of the soft iron motor. The permanent magnets have no pole shoes and are thus directly positioned at the air gap. They are magnetized in a radial direction and their thickness, like that of the mechanical air gap, is constant. Similarly, the distance between the rotor core and the stator surface facing the rotor is also constant. The permanent magnets are made of an SmCo (samarium cobalt) material. The SmCo material is characterized by high remanent induction and high coercive field strength. When subjected to an external field, this material behaves similar to air in terms of its permeability.

The stator three-phase winding consisting of coils with unequal number of turns is fed by a static converter with a sinusoidal-shaped three-phase currents. The stator currents produce a stator electric loading (average ampere conductors per cm of the air-gap periphery).

The currents are controlled depending upon the rotor position so that the electric loading is only routed along the q axis. Thus, a definitive correlation of the stator electric loading with the exciter field generated by the permanent magnets is established. This fixed correlation is comparable to the orientation brought about by the commutator and the brushes of the rotor electric loading to the stator-wide exciter field in a d.c. commutator machine with stator-wide excitation. As the material of the permanent magnets behaves similar to air towards the magnetic field (armature field) generated by the stator electric loading, an magnetic air gap is effective in developing the armature field, which magnetic air gap comprises the mechanical air gap and the magnet thickness.

The armature field formed influences the exciter field, which is generated by the permanent magnets, so that it is enhanced at one edge of the permanent magnet and diminished at the other edge. Aside from the danger of demagnetizing, the excessive field increase generated by the armature reaction requires higher voltage ratings in the converter components, such as transistors, thyristors, commutation devices, thereby necessitating added expense.

German Patent Document Offenlegungsschrift No. 2.637.705 also describes a small motor with permanent-magnet excitation in which the permanent magnets are arranged in the stator. The rotor has a commutator winding which is fed via brushes and commutator by a d.c. voltage supply. Thus, the rotor electric loading has a fixed relationship to the exciter field generated by the permanent magnets in the stator. The rotor electric loading generates a magnetic field (armature field) which, given high motor loads, can irreversibly demagnetize the permanent magnets at the trailing edges. To suppress the damaging effect of the armature field, the thickness of each permanent magnet in the direction of magnetization is chosen to increase from the entering edge to the trailing edge of the permanent magnet. This measure produces an approximately constant field pattern for a given load parameter in the air gap above the permanent magnets.

It is an object of the present invention to provide an electrical machine of synchronous design which reduces the voltage rating due to the armature reaction in the converter components.

Another object of the present invention is to reduce the overrating of the switching elements of the static converter due to the armature reaction in a static converter-fed electrical machine.

SUMMARY OF THE INVENTION

Briefly stated, in accordance with one aspect of the invention the foregoing objects are achieved by providing a synchronous electrical machine which has a stator including a stator winding fed by a static converter. The machine has a rotor which is separated from the stator by an air gap and is excited by permanent magnets on the rotor between which pole gaps are positioned. The rotor has a soft magnetic portion on a circumferential surface of which the permanent magnets are arranged directly adjoining the mechanical air gap. The machine has a preferred direction of rotation. Each permanent magnet has a thickness in the direction of magnetization which increases from a first (entering) edge of the permanent magnet to the other (trailing or leaving) edge of the permanent magnet in the preferred direction of rotation. The thickness at the first (entering) edge is nearly zero and the gap between the stator surface facing the rotor and the surface of the soft-magnetic part of the rotor increases from the first edge of the permanent magnet to the adjoining pole gap.

BRIEF DESCRIPTION OF THE DRAWING

While the specification concludes with claims particularly pointing out and distinctly claiming the subject matter which is regarded as the invention, it is believed that the invention will be better understood from the following description of the preferred illustrative embodiment taken in conjunction with the accompanying drawing wherein the solo illustration in an unwound projection schematically depicts the arrangement and design of the electromagnetically active components of a multi-pole synchronous motor with a radial field excited by permanent magnets in accordance with the invention.

DESCRIPTION OF A PREFERRED EMBODIMENT

Referring to the drawing, the radial direction is designated by arrow 1 and the circumferential direction by arrow 2. Stator 3 of a converter-fed motor has a multi-phase winding 4 of which, to simplify the illustration, only the electrical loading of some conductors 4 are shown. The multi-phase winding of stator 3 is fed by a static converter with rectangular shaped currents (not shown).

The soft-magnetic part 5 of rotor 6 is laminated. Permanent magnets 7 are mounted on the circumferential surface of the soft-magnetic part 5 facing stator 3. Permanent magnets 7 serve to excite the motor and consist of a hard magnetic material with a high remanent induction and high coercive field strength, e.g., an SmCo material. Permanent magnets 7 are made of blocks 8 of rectangualar cross section extended in an axial direction and are held on the rotor 6 safely resisting centrifugal force by banding 9. The blocks 8 of rectangular cross section could all be of the same type to facilitate their manufacture and storage. Permanent magnets 7 do not totally fill the entire pole pitch 10. The edges 11, 12 of permanent magnets 7 placed along the circumference of rotor 6 limit pole gaps 13 and gaps 14 between banding 9 and the soft-magnetic part 5 of rotor 6. In order to obtain a consistent and constant load on banding 9, pole gaps 13 and gaps 14 between banding 9 and the soft-magnetic part 5 of rotor 6 are filled with non-magnetic material, e.g., copper. Moreover, banding 9 produces a smooth rotor surface so that the air friction losses in the nearly constant mechanical air gap 15 are slight.

Permanent magnets 7 are magnetized in the radial direction as indicated by arrow 1. The thickness in the direction of magnetization of each permanent magnet 7 increases from the first edge 11 to the other edge 12 in the direction of rotation indicated by arrow 16, the first edge 11 being the entering edge and the other edge 12 being the leaving or trailing edge. In the preferred embodiment the thickness increases incrementally with the thickness of a block 8. The required steps in the soft-magnetic part 5 of the rotor 6 are stamped out since the soft-magnetic part 5 of rotor 6 is laminated, thereby assuring simple fabrication of rotor 6. Due to the curvature of the rotor surface, slight joints are formed between the blocks 8 which can be ignored in multi-pole machines due to their slight curvature.

From edge 11 of a permanent magnet 7 proceeding to the adjoining pole gap 13, the radial gap 17 increases between the surface of stator 3 facing rotor 6 and the soft-magnetic part 5 of rotor 6. The gap 17 consists of the width of air gap 15, the thickness of banding 9 and the thickness of the filling material in gap 14.

Thus, the magnetic material is arranged assymmetrically about the center 18 between pole gaps 13. The magnetic material arranged on both sides of center 18 extends unevently in both directions, also. The assymmetric and uneven magnetic material arrangement, in conjunction with the feeding of the stator winding, results in increased motor efficiency. The stator winding of the static converter motor is fed so that the center 18 lags electrically behind the commutating conductors of the stator winding by nearly 90 degrees (one-half pole pitch 10) during rated operation. In normal or rated operation a nearly constant field will exist in the air gap 15 in the area between the pole gaps 13. Therein the wave shape of the field pattern in air gap 15 nearly coincides with the time pattern of the feeding currents so that, compared to a symmetric three-phase machine with a sinusoidal-shaped field and the same amplitude values of current and field the output is nearly increased by a factor or 2. As there is no field increase as is the case in machine units with permanent magnets of a constant thickness, the switching elements of the static converter hardly need to be overrated. Because the average value of the induction is of a similar magnitude as the maximum value of the induction itself, the motor core attains a high level of efficiency. Because not all of the soft-magnetic area between pole gaps 13 is covered with magnetic material, the pulsation losses in permanent magnets 7 are reduced.

The permanent magnets 7 or the blocks 8 are mounted in a light pre-magnetized fashion on the soft-magnetic part 5 so that blocks 8 retain themselves in position to simplify the assembly of rotor 6. After the banding of rotor 6, the final magnetization of permanent magnets 7 takes place within stator 3 of the converter-fed motor by means of conductors 4.

It will now be understood that the present invention reduces the overrating of the switching elements of the static converter due to the impact of the armature reaction in a converter-fed electrical machine. This is achieved by designing an electrical machine as a synchronous motor with a preferred direction of rotation so that each permanent magnet has a thickness in the direction of magnetization that increases from the first entering edge of the permanent magnet to the other leaving or trailing edge of the permanent magnet in the direction of the preferred rotation. The thickness at the first entering edge is nearly zero and, advancing from this edge to the adjoining pole gap, the magnetic air gap between the stator surface facing the rotor and the surface of the soft-magnetic part of the rotor increases.

In a synchronous-type electrical motor designed in accordance with this invention, the magnetic material is aligned assymmetrically about the middle between the pole gaps and extends, with reference from this midpoint, unevenly in increments towards both sides. The negative impact of the armature field is thereby substantially reduced. In those areas in which the field weakening effect of the stator electric loading arises, there is more magnetic material and thus a greater magnetic air gap than in those areas in which the field-enhancing effect of the stator electric loading arises. Areas with substantial magnetic material produce, on the one hand, a strong exciter field and, on the other hand, the armature field, due to the greater magnetic air gap embodied in the magnetic material, does not develop strongly so that the weakening of the permanent-magnet field is slight. Given proper shaping of the permanent magnets and taking into account the stator winding design and the power supply of the electrical machine, a nearly constant magnetic field will be realized in the area between the pole gaps at rated operation so that due to the lack of any excessive field strength, only a slight voltage reserve is required in the converter component. Moreover, the losses are reduced due to pulsation in the rotation permanent magnets since the width of the cover with magnetic material in relationship to the pole pitch is less than in traditional machines. This is particularly important for larger electrical machines in which the heat loss of the rotor can only be dissipated by way of the cooling air flowing through the air gap.

Moreover, the permanent magnets can be easily magnetized within the electrical machine by the stator winding. This is because those conductors or coils of the stator winding which face those areas of the rotor not fitted with magnetic material can be used for remagnetization. Conversely, in conventional machines, only those conductors of the stator winding which face the pole gaps can be used. In the present invention these areas are wider than in conventional machines with more conductors available for remagnetizing so that lower remagnetizing currents are required or, conversely, a higher field strength for magnetization is obtained for a given current value.

It can now be appreciated that there has been described a synchronous electrical machine with permanent magnet excitation which suppresses the damaging effects of the armature field and produces an approximately constant field pattern for a given load parameter in the air gap above the permanent magnets. The resulting reduction in the field increase due to the armature reaction reduces the need to highly overate the switching elements of the static converter. This simplifies the design and is economically desirable.

As will be evident from the foregoing description, certain aspects of the invention are not limited to the particular details of the examples illustrated, and it is therefore contemplated that other modifications or application will occur to those skilled in the art. It is accordingly intended that the claims shall cover all such modifications and applications as do not depart from the true spirit and scope of the invention.

What is claimed as new and desired to be secured by Letters Patent of the United States is:

1. A synchronous electrical machine having a stator including a stator winding and a rotor separated by an air-gap, permanent magnets on the rotor for exciting it, the rotor including pole gaps positioned between permanent magnets and the rotor having a soft-magnetic part having a circumferential surface on which the permanent magnets are arranged directly adjoining the mechanical air-gap, the machine comprising: the rotor having a preferred direction of rotation, each of said permanent magnets having a thickness in the direction of magnetization which increases from a first edge of the permanent magnet to the other edge of the permanent magnet in the preferred direction of rotation, the thickness at the entering edge being nearly zero and the gap between the stator surface facing the rotor and the surface of the soft-magnetic part of the rotor increasing from said first edge to the adjoining pole gap.

2. A synchronous electrical machine in accordance with claim 1, wherein the permanent magnets are comprised having blocks of rectangular cross-section, which are secured on the rotor by a band and the pole gaps and gaps between the band and the soft-magnetic part of the rotor are filled with non-magnetic material.

3. A synchronous electrical machine in accordance with claim 1, wherein the soft-magnetic rotor is laminated.

4. A synchronous electrical machine in accordance with claim 1, wherein the stator winding comprises a symmetrical multi-phase winding whose phase number is at least three and said winding is fed by currents whose time pattern is multi-phase rectangular.

* * * * *